(12) United States Patent
Wang et al.

(10) Patent No.: US 10,736,123 B2
(45) Date of Patent: *Aug. 4, 2020

(54) RESOURCE SCHEDULING METHOD AND APPARATUS

(71) Applicant: HUAWEI TECHNOLOGIES CO., LTD., Shenzhen (CN)

(72) Inventors: Li Wang, Shenzhen (CN); Zhenxing Hu, Shenzhen (CN); Jie Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,999

(22) Filed: Nov. 2, 2018

(65) Prior Publication Data

US 2019/0075574 A1 Mar. 7, 2019

Related U.S. Application Data

(63) Continuation of application No. 14/297,050, filed on Jun. 5, 2014, now Pat. No. 10,159,084, which is a (Continued)

(30) Foreign Application Priority Data

Dec. 5, 2011 (CN) .......................... 2011 1 0398555

(51) Int. Cl.
*H04L 5/00* (2006.01)
*H04L 12/26* (2006.01)
*H04W 72/12* (2009.01)

(52) U.S. Cl.
CPC .................................. *H04W 72/12* (2013.01)

(58) Field of Classification Search
None
See application file for complete search history.

(56) References Cited

U.S. PATENT DOCUMENTS 9,661,621 B2 * 5/2017 Park ..................... H04L 5/0053
2009/0154419 A1 6/2009 Yoshida et al.
(Continued)

FOREIGN PATENT DOCUMENTS

CN 1747594 3/2006
CN 101064563 10/2007
(Continued)

OTHER PUBLICATIONS

Chinese Office Action dated Dec. 11, 2014 in corresponding Chinese Patent Application No. 201110398555.2.
(Continued)

*Primary Examiner* — Sithu Ko
(74) *Attorney, Agent, or Firm* — Kilpatrick Townsend & Stockton LLP (57) ABSTRACT

Resource scheduling includes pre-dividing a resource block RB into a plurality of sub-RBs and scheduling a UE by using a resource scheduling indication during data transmission to perform data receiving or sending in a position of a corresponding sub-RB. The resource block RB is pre-divided into a plurality of sub-RBs and during data transmission the UE is scheduled by using the resource scheduling indication to perform data receiving or sending in the position of the corresponding sub-RB, thereby improving resource utilization efficiency during transmission of a small data service and improving transmission efficiency of small data.

26 Claims, 2 Drawing Sheets

A base station pre-divides a resource block RB into a plurality of sub-RBs by using at least one division manner of time division, frequency division, code division, and space division — 101

The base station sends a resource scheduling indication to a user equipment UE during data transmission, where the resource scheduling indication is used for indicating a divided sub RB corresponding to the UE — 102

The base station schedules the UE by using the resource scheduling indication to perform data receiving or sending in a position of the corresponding divided sub-RB — 103

Related U.S. Application Data continuation of application No. PCT/CN2012/085956, filed on Dec. 5, 2012.

(56) References Cited

U.S. PATENT DOCUMENTS

| | | | | |
|---|---|---|---|---|
| 2009/0262699 | A1* | 10/2009 | Wengerter | H04L 1/0072 370/330 |
| 2010/0034303 | A1 | 2/2010 | Damnjanovic et al. | |
| 2011/0002293 | A1* | 1/2011 | Yuk | H04W 72/0406 370/329 |
| 2011/0122860 | A1 | 5/2011 | Guan et al. | |
| 2011/0237283 | A1* | 9/2011 | Shan | H04L 5/0091 455/509 |
| 2011/0299496 | A1* | 12/2011 | Iwai | H04L 5/0037 370/329 |
| 2012/0069764 | A1* | 3/2012 | Classon | H04L 5/0007 370/252 |
| 2012/0269249 | A1 | 10/2012 | Ishii et al. | |
| 2012/0287885 | A1* | 11/2012 | Dai | H04W 72/044 370/329 |
| 2013/0044713 | A1* | 2/2013 | Suh | H04L 5/0048 370/329 |
| 2013/0114517 | A1* | 5/2013 | Blankenship | H04L 5/0053 370/329 |
| 2013/0121278 | A1* | 5/2013 | Noh | H04W 72/0453 370/329 |
| 2014/0254545 | A1 | 9/2014 | Novak et al. | |

FOREIGN PATENT DOCUMENTS

| | | |
|---|---|---|
| CN | 101242627 A | 8/2008 |
| CN | 101442811 | 5/2009 |
| CN | 101754232 | 6/2010 |
| CN | 101827446 | 9/2010 |
| CN | 101911758 A | 12/2010 |
| CN | 101969666 | 2/2011 |
| CN | 101969666 A | 2/2011 |
| CN | 102119505 A | 7/2011 |
| CN | 102215590 A1 | 10/2011 |
| CN | 102238732 A1 | 11/2011 |
| CN | 102256358 | 11/2011 |
| EP | 1 528 830 A1 | 5/2005 |
| EP | 1528830 A1 | 5/2005 |
| EP | 1 956 771 A2 | 8/2008 |
| EP | 1956771 A2 | 8/2008 |
| WO | 2007120017 A2 | 10/2007 |
| WO | WO 2007/12001 7 A2 | 10/2007 |

OTHER PUBLICATIONS

"On RAN enhancements for MTC in Rel-11", ZTE, 3GPP TSG-RAN WG2 meeting #74, Spain, May 2011, 7pp.

International Search Report dated Mar. 7, 2013, in corresponding International Patent Application No. PCT/CN2012/085956.

PCT International Search Report and Written Opinion of the International Searching Authority dated Mar. 7, 2013 in corresponding International Patent Application No. PCT/CN2012/085956.

Office Action for U.S. Appl. No. 14/297,050 dated Apr. 1, 2016.

Final Office Action for U.S. Appl. No. 14/297,050 dated Oct. 28, 2016.

Office Action for U.S. Appl. No. 14/297,050 dated Aug. 18, 2017.

Final Office Action for U.S. Appl. No. 14/297,050 dated Jan. 5, 2018.

Notice of Allowance for U.S. Appl. No. 14/297,050 dated Aug. 15, 2018.

U.S. Appl. No. 14/297,050, filed Jun. 5, 2014, Li Wang, Huawei Technologies Co., Ltd.

* cited by examiner

RESOURCE SCHEDULING METHOD AND APPARATUS

CROSS-REFERENCE TO RELATED APPLICATION

This application is a continuation of U.S. patent application Ser. No. 14/297,050, filed on Jun. 5, 2014, which is a continuation of International Application No. PCT/CN2012/085956, filed on Dec. 5, 2012. The International Application claims priority to Chinese Patent Application No. 201110398555.2, filed on Dec. 5, 2011. All of the aforementioned patent applications are hereby incorporated by reference in their entireties.

TECHNICAL FIELD

Embodiments of the present invention relate to the field of communications technologies, and in particular to a resource scheduling method and apparatus.

BACKGROUND

The Internet of Things (M2M, Machine to Machine) refers to a large number of intelligent terminals that are interconnected through a network, thereby implementing collaboration and interoperation. Internet of Things based on cellular radio communications is capable of connecting various intelligent terminals by using an existing cellular radio network, and this is the most economical and effective communication manner at present. With the rapid popularization of M2M application, the number of M2M devices will become huge. These devices combine tightly with wireless communications technologies to obtain data or report data to a control center through a wireless connection. A large amount of randomly or periodically reported data are generated, and the data probably come from various specific applications, such as a wireless water meter and electricity meter, a vending machine, a POS machine, and a remote control device in a smart grid.

An M2M small data service has a feature in which a large number of terminals perform transmission simultaneously while the data amount is small. Sometimes, data packets transmitted at a time, such as uplink and downlink periodical heartbeat packets of a large number of users and downlink feedback of RLC/TCP of a large amount of uplink users, are within 10 bytes and even ten-odd bits (bit).

In the existing LTE, a minimum scheduling unit is a resource block (RB, Resource Block) whose size is 144 resource elements (RE, Resource Element) and minimum transmission is 16 bit data. Apart from a control symbol, a channel measurement reference signal (CRS, CSI reference signal) and a demodulation reference signal (DM RS, Demodulation Reference Signal) in the RB, typical configuration is as follows: a normal cyclic shift (CP, Cyclic Prefix), 3 control symbols, 4 transmit antennas, a single stream, and 100 REs used for data transmission. For the data amount of only ten-odd bits and even several bits in the M2M small data service, during transmission of one RB, a symbol rate is 1/10 and even lower, and the spectral efficiency is about 0.14.

It can be seen that resource utilization during transmission of a small data service is quite low and is meaningful only under an extremely low signal to noise ratio. As the quality of channel conditions improves, spectral efficiency loss becomes increasingly serious.

SUMMARY

Embodiments of the present invention provide a resource scheduling method and apparatus so as to improve resource utilization efficiency during transmission of a small data service.

An embodiment of the present invention provides a resource scheduling method, including:

pre-dividing, by a base station, a resource block RB into a plurality of sub-RBs by using at least one division manner of time division, frequency division, code division, and space division;

sending, by the base station, a resource scheduling indication to a user equipment UE during data transmission, where the resource scheduling indication is used to indicate a divided sub-RB corresponding to the UE; and scheduling, by the base station by using the resource scheduling indication, the UE to perform data receiving or sending in a position of the corresponding divided sub-RB.

An embodiment of the present invention further provides a resource scheduling method, including:

receiving, by a user equipment UE, a resource scheduling indication sent by a base station during data transmission, where the resource scheduling indication is used to indicate a divided sub-RB corresponding to the UE, and the sub-RB is obtained after the base station pre-divides a resource block RB into a plurality of sub-RBs by using at least one division manner of time division, frequency division, code division, and space division; and performing, by the UE, data receiving or sending in a position of the corresponding divided sub-RB according to the received resource scheduling indication.

An embodiment of the present invention further provides a resource scheduling apparatus, and the apparatus includes:

a division unit, configured to pre-divide a resource block RB into a plurality of sub-RBs by using at least one division manner of time division, frequency division, code division, and space division;

a transmission unit, configured to send a resource scheduling indication to a user equipment UE during data transmission, where the resource scheduling indication is used to indicate a sub-RB that is divided by the division unit and corresponds to the UE; and a scheduling unit, configured to schedule the UE by using the resource scheduling indication to perform data receiving or sending in a position of the corresponding sub-RB divided by the division unit.

An embodiment of the present invention further provides a resource scheduling apparatus, and the apparatus includes:

a transmission unit, configured to receive a resource scheduling indication sent by a base station, where the resource scheduling indication is used to indicate a divided sub-RB corresponding to a UE, and the sub-RB is obtained after the base station pre-divides a resource block RB into a plurality of sub-RBs by using at least one division manner of time division, frequency division, code division, and space division; and a data processing unit, configured to perform data receiving or sending in a position of the corresponding divided sub-RB according to the resource scheduling indication received by the transmission unit.

A resource block RB is pre-divided into a plurality of sub-RBs by applying the method and the apparatus that are provided in the embodiments of the present invention; and during data transmission, a UE is scheduled by using a resource scheduling indication to perform data receiving or sending in a position of a corresponding sub-RB, thereby improving resource utilization efficiency during transmission of a small data service and improving transmission efficiency of small data.

BRIEF DESCRIPTION OF DRAWINGS

The accompanying drawings required for describing the embodiments or the prior art are introduced below to illustrate briefly the technical solutions according to the embodiments of the present invention or in the prior art more clearly. Apparently, the accompanying drawings in the following descriptions merely show some of the embodiments of the present invention, and persons of ordinary skill in the art can obtain other drawings according to the accompanying drawings without creative efforts.

DESCRIPTION OF EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
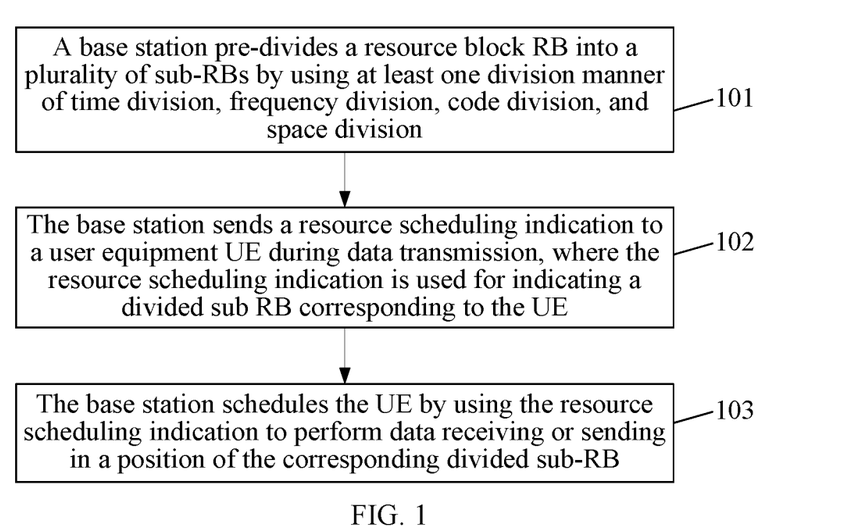
FIG. 1 is a flow chart of a resource scheduling method according to an embodiment of the present invention.

Referring to FIG. 1, it is a flow chart of a resource scheduling method according to an embodiment of the present invention. The method is applied in a base station and specifically includes:

Step 101: A base station pre-divides a resource block RB into a plurality of sub-RBs by using at least one division manner of time division, frequency division, code division, and space division.

For example, one RB may be divided into 2 to 4 sub-RBs.

Step 102: The base station sends a resource scheduling indication to a user equipment UE during data transmission, where the resource scheduling indication is used to indicate a divided sub-RB corresponding to the UE.

Step 103: The base station schedules the UE by using the resource scheduling indication to perform data receiving or sending in a position of the corresponding divided sub-RB.

That is to say, the UE performs channel estimation in an original unit of RB, only decodes its data symbol corresponding to a scheduled sub-RB according to the resource scheduling indication, and performs data receiving or sending on a sub-RB belonging to the UE. In an uplink direction, in a process of sending, by multiple UEs in a same RB, a demodulation reference signal (DM RS, demodulation reference signal), code division is performed by using different cyclic shift versions in a same base (base) sequence. This is consistent with an uplink multi-user multi input multi output (uplink MU-MIMO, uplink Multi-User Multi Input Multi Output) manner.

The resource scheduling indication may be carried by using the following manners:

Manner 1: It is carried in a bit position newly added in a resource block assignment (Resource block assignment) instruction.

Manner 2: It is carried by using downlink control information (DCI, Downlink Control Information). That is, for a small data service, DCI information is simplified to vacate a position to carry the resource scheduling indication. In this manner, not only an allocation indication manner of the sub-RB can be redefined on the basis of an existing DCI format, but also a new DCI format can be redefined.

Manner 3: No bit position is newly added in the resource block assignment (Resource block assignment) instruction, and the resource scheduling indication is carried by using a predefined manner.

The following separately describes each implementation manner in detail.

For manner 1:

Bandwidth indicated in a system message is enabled to be slightly greater than actual bandwidth, so that the number of bits of the corresponding resource block assignment (Resource block assignment) instruction in a physical downlink control channel (PDCCH) increases. The specific increased data amount is shown in table 1.

TABLE 1

| Resource allocation manner | DL/UL | The total number of bits | The number of bits containing the indication | Description |
|---|---|---|---|---|
| Direct bitmap (Direct bitmap) | Downlink DL | $N_{RB'}^{DL}$ | $N_{RB'}^{DL} - N_{RB}^{DL}$ | $N_{RB}^{DL} \leq 10$ |
| Type 0 bitmap (Type 0 bitmap) | Downlink DL | $\lceil N_{RB'}^{DL}/P \rceil$ | $\lceil N_{RB'}^{DL}/P \rceil - \lceil N_{RB}^{DL}/P \rceil$ | RB group size (group size) P = 2, 3, 4 |
| Type 1 bitmap (Type 1 bitmap) | Downlink DL | $\lceil N_{RB'}^{DL}/P \rceil$ | $\lceil N_{RB'}^{DL}/P \rceil - \lceil N_{RB}^{DL}/P \rceil$ | P = 2, 3, 4 |

TABLE 1-continued

| Resource allocation manner | DL/UL | The total number of bits | The number of bits containing the indication | Description |
|---|---|---|---|---|
| Type 2 contiguous allocation (Type 2 contiguous allocation) | Downlink DL or uplink UL | $\lceil \log_2(N_{RB'}^{DL/UL}(N_{RB'}^{DL/UL}+1))\rceil$ | $\lceil \log_2(N_{RB'}^{DL/UL}(N_{RB'}^{DL/UL}+1))\rceil -$ $\lceil \log_2(N_{RB}^{DL/UL}(N_{RB}^{DL/UL}+1))\rceil$ | |
| Distributed allocation (Distributed allocation) | Downlink DL | $\lceil \log_2(N_{RB'}^{DL}(N_{RB'}^{DL}+1))\rceil$ | $\lceil \log_2(N_{RB'}^{DL}(N_{RB'}^{DL}+1))\rceil -$ $\lceil \log_2(N_{RB}^{DL}(N_{RB}^{DL}+1))\rceil$ | |

In table 1, $N_{RB}^{DL/UL}$ represents the number of resource blocks RBs specified in a standard of a system, and $N_{RB'}^{DL/UL}$ represents the number of resource blocks RBs actually notified for allocation in the system. Multiple RBs form one group, that is, an RB group, and P represents the number of RBs in each group. DL represents a downlink direction, and UL represents an uplink direction.

That is to say, sending, by the base station, the resource scheduling indication to the UE during data transmission includes: during data transmission, sending, by the base station, the resource scheduling indication to the user equipment according to a resource allocation manner used in the transmission, where the resource scheduling indication is carried in a bit position newly added in the resource block assignment instruction.

The sending, by the base station, the resource scheduling indication to the user equipment according to a resource allocation manner used in the transmission, where the resource scheduling indication is carried in a bit position newly added in the resource block assignment instruction includes:

if downlink transmission is performed and a resource allocation manner of a direct bitmap is used, obtaining the number of bits through $N_{RB'}^{DL}-N_{RB}^{DL}$, where the resource scheduling indication sent to the user equipment is carried in a bit position corresponding to the number of bits in the resource block assignment instruction;

if downlink transmission is performed and a resource allocation manner of a type 0 bitmap is used, obtaining the number of bits through $\lceil N_{RB'}^{DL/UL}/P\rceil -\lceil N_{RB}^{DL/UL}/P\rceil$, where P=2, 3, or 4, and the resource scheduling indication sent to the user equipment is carried in a bit position corresponding to the number of bits in the resource block assignment instruction;

if downlink transmission is performed and a resource allocation manner of a type 1 bitmap is used, obtaining the number of bits through $\lceil N_{RB'}^{DL/UL}/P\rceil -\lceil N_{RB}^{DL/UL}/P\rceil$, where P=2, 3, or 4, and the resource scheduling indication sent to the user equipment is carried in a bit position corresponding to the number of bits in the resource block assignment instruction;

if uplink or downlink transmission is performed and a resource allocation manner of type 2 contiguous allocation is used, obtaining the number of bits through $\lceil \log_2(N_{RB'}^{DL/UL}(N_{RB'}^{DL/UL}+1))\rceil -\lceil \log_2(N_{RB}^{DL/UL}(N_{RB}^{DL/UL}+1))\rceil$, where the resource scheduling indication sent to the user equipment is carried in a bit position corresponding to the number of bits in the resource block assignment instruction; and if downlink transmission is performed and a resource allocation manner of distributed allocation is used, obtaining the number of bits through $\lceil \log_2(N_{RB'}^{DL/UL}(N_{RB'}^{DL/UL}+1))\rceil -\lceil \log_2(N_{RB}^{DL/UL}(N_{RB}^{DL/UL}+1))\rceil$, where the resource scheduling indication sent to the user equipment is carried in a bit position corresponding to the number of bits in the resource block assignment instruction;

where $N_{RB}^{DL/UuL}$ is the number of resource blocks RBs specified in the standard of the system, $N_{RB'}^{DL/UL}$ is the number of resource blocks RBs actually notified for allocation in the system; P is the number of RBs contained in the RB group; and DL represents a downlink direction, and UL represents an uplink direction.

The manner 1 is applicable to a device supporting both small data and common data, such as a UE supporting both small data and common data. However, when the UE processes the common data, the newly added bit is set to 0, that is, a common UE is not allowed to use the newly added bit position. Only a UE transmitting small data can use the newly added bit position, and the newly added bit position is only used to indicate sub-RB allocation.

For manner 2:

Specifically, the resource scheduling indication is carried in downlink control information (DCI, Downlink Control Information). For the reason of the application, several aspects may be considered:

a) the small data occupies few resources, which generally are less than one RB; therefore RB allocation information can be simplified greatly, for example, length (length) information is reduced or deleted on the basis of type 2 (type 2);

b) since the small data service does not need a high-order modulation and coding scheme (MCS), the number of bits of the MCS can be reduced, for example, the number of bits of the MCS is reduced from 5 bits to 3 bits, or is less or even is deleted;

c) the small data only needs a single hybrid automatic repeat request (HARQ) process, and therefore the number of bits of HARQ information can be reduced, for example, HARQ information of 3 bits is simplified into 1 bit and even is deleted; and d) HARQ redundancy version information may also be simplified in space; and because a bit rate of the small data is already lower than an original bit rate, 1 bit can be kept or the information is deleted.

Based on the foregoing considerations, the redundancy information may be: RB allocation indication information, modulation and coding scheme (MCS) information, hybrid automatic repeat request (HARQ) information, or HARQ redundancy version information.

For example, DCI format 1 (DCI format 1) is taken as an example, and an allocation indication manner of a sub-RB redefined on the basis of the existing DCI format is shown in table 2:

TABLE 2

| Information type (Information type) | Number of bits on PDCCH (Number of bits on PDCCH) | Purpose (Purpose) |
|---|---|---|
| Resource allocation header (Resource allocation header) | 1 | Indicates whether resource allocation type 0 or 1 is used (Indicates whether resource allocation type 0 or 1 is used) |
| Resource block assignment (Resource block assignment) | Depending on resource block number and subRB number (Depending on resource block number and subRB number) | Indicates 1 resource block and bitmap inside this RB to be assigned to the UE (Indicates 1 resource block and bitmap inside this RB to be assigned to the UE) |
| Modulation and coding scheme (Modulation and coding scheme) | 5 | Indicates modulation scheme and, together with the number of allocated physical resource blocks, the transport block size (Indicates modulation scheme and, together with the number of allocated physical resource blocks, the transport block size |
| Hybrid automatic repeat request process number (HARQ process number) | 4 (time division multiplexing TDD), 3 (frequency division multiplexing FDD) | Identifies the HARQ process the packet is associated with (Identifies the HARQ process the packet is associated with) |
| New data indicator (New data indicator) | 1 | Indicates whether the packet is a new transmission or a retransmission (Indicates whether the packet is a new transmission or a retransmission) |
| Redundancy version (Redundancy version) | 2 | Identifies the redundancy version used for coding the packet (Identifies the redundancy version used for coding the packet) |
| Transmit power control command for a physical uplink control channel (TPC command for PUCCH) | 2 | Transmit power control (TPC) command for adapting the transmit power on the Physical Uplink Control Channel (PUCCH) (Transmit power control (TPC) command for adapting the transmit power on the Physical Uplink Control Channel (PUCCH)) |
| Downlink assignment index (time division multiplexing only) (Downlink assignment index (TDD only)) | 2 | Number of downlink subframes for uplink ACK/NACK bundling (Number of downlink subframes for uplink ACK/NACK bundling) |

In the embodiment shown in table 2, resource block assignment (Resource block assignment) information is redefined.

For another example, DCI format 1 (DCI format 1) is taken as an example, and a new DCI format 1X is defined shown in table 3:

| Information type (Information type) | Number of bits on PDCCH (Number of bits on PDCCH) | Purpose (Purpose) |
|---|---|---|
| Resource allocation header (Resource allocation header) | 1 | Indicates whether resource allocation type 0 or 1 is used (Indicates whether resource allocation type 0 or 1 is used) |
| Resource block assignment (Resource block assignment) | Depending on resource block number and subRB number (Depending on resource block number and subRB number) | Indicates 1 resource block and bitmap inside this RB to be assigned to the UE (Indicates 1 resource block and bitmap inside this RB to be assigned to the UE) |
| Modulation and coding scheme (Modulation and coding scheme) | 3 (2) | Indicates modulation scheme and, together with the number of allocated physical resource blocks, the transport block size (Indicates modulation scheme and, together with the number of allocated physical resource blocks, the transport block size) |
| Hybrid automatic repeat request process number (HARQ process number) | 1 (TDD), 1 (FDD) (3(TDD), 2(FDD)) | Identifies the HARQ process the packet is associated with (Identifies the HARQ process the packet is associated with) |

-continued

| Information type (Information type) | Number of bits on PDCCH (Number of bits on PDCCH) | Purpose (Purpose) |
|---|---|---|
| New data indicator (New data indicator) | 1 | Indicates whether the packet is a new transmission or a retransmission (Indicates whether the packet is a new transmission or a retransmission) |
| Redundancy version (Redundancy version) | 1 (1) | Identifies the redundancy version used for coding the packet (Identifies the redundancy version used for coding the packet) |
| Transmit power control command for a physical uplink control channel (TPC command for PUCCH) | 2 | Transmit power control (TPC) command for adapting the transmit power on the Physical Uplink Control Channel (PUCCH) (Transmit power control (TPC) command for adapting the transmit power on the Physical Uplink Control Channel (PUCCH)) |
| Downlink assignment index (time division multiplexing only) (Downlink assignment index (TDD only)) | 2 | Number of downlink subframes for uplink ACK/NACK bundling (Number of downlink subframes for uplink ACK/NACK bundling) |

In the embodiment shown in table 3, the new DCI format 1X is defined, and the resource scheduling indication can be carried by using the newly defined DCI.

In the embodiments shown in table 2 and table 3, the DCI formats dedicated for small data are described. Therefore, a UE only transmitting a small data service is capable of decoding a PDCCH according to the DCI formats shown in table 2 or table 3.

For another example, according to the characteristics of the small data service, the DCI format may not be changed, and redundancy information in the existing DCI is used to perform sub-RB assignment, which is shown in table 4:

TABLE 4

| Information type (Information type) | Number of bits on PDCCH (Number of bits on PDCCH) | Purpose (Purpose) |
|---|---|---|
| Resource allocation header (Resource allocation header) | 1 | Indicates whether PDCCH schedule or transmission is used (Indicates whether PDCCH schedule or transmission is used) |
| Resource block assignment (Resource block assignment) | Type 2 (shortened length part) Type 2 (shortened length part)) | Indicates resource blocks to be assigned to the UE (Indicates resource blocks to be assigned to the UE) |
| Modulation and coding scheme (Modulation and coding scheme) | 3 (2) | Indicates modulation scheme and, together with the number of allocated physical resource blocks, the transport block size (Indicates modulation scheme and, together with the number of allocated physical resource blocks, the transport block size) |
| Hybrid automatic repeat request process number (HARQ process number) | 1 (TDD), 1 (FDD) (3 (TDD), 2 (FDD)) | Identifies the HARQ process the packet is associated with (Identifies the HARQ process the packet is associated with) |
| New data indicator (New data indicator) | 1 | Indicates whether the packet is a new transmission or a retransmission (Indicates whether the packet is a new transmission or a retransmission) |
| Redundancy version (Redundancy version) | 1 (1) | Identifies the redundancy version used for coding the packet (Identifies the redundancy version used for coding the packet) |
| Transmit power control command for a physical uplink control channel (TPC command for PUCCH) | 2 | Transmit power control (TPC) command for adapting the transmit power on the Physical Uplink Control Channel (PUCCH) (Transmit power control (TPC) command for adapting the transmit power on the Physical Uplink Control Channel (PUCCH)) |

TABLE 4-continued

| Information type (Information type) | Number of bits on PDCCH (Number of bits on PDCCH) | Purpose (Purpose) |
|---|---|---|
| Downlink assignment index (time division multiplexing only) (Downlink assignment index (TDD only)) | 2 | Number of downlink subframes for uplink ACK/NACK bundling (Number of downlink subframes for uplink ACK/NACK bundling) |
| Subresource block assignment (subRB assignment) | Depending on subRB resource allocation type and saving bits (Depending on subRB resource allocation type and saving bits) | Indicates subresource blocks to be assigned to the UE (Indicates subresource blocks to be assigned to the UE) |

In the embodiment shown in table 4, the resource scheduling indication may be carried in the RB allocation indication information, the MCS information, the HARQ information, or the HARQ redundancy version information. For example, when an MCS manner is used, the MCS may be reduced from original 5 bits to 3 bits; in this way, 2 bits are vacated to carry the resource scheduling indication. For another example, when the redundancy version manner is used, the redundancy version is simplified from the original 2 bits to 1 bit; in this way, 1 bit is vacated to carry the resource scheduling indication. The size of the DCI format does not change by applying this manner, and the meaning of a part of the fields needs to be reinterpreted for the UE transmitting small data. That is, redundancy information of the DCI is used to perform sub-RB assignment.

That is to say, the sending, by the base station, the resource scheduling indication to the UE during data transmission includes: sending, by the base station, downlink control information DCI carrying the resource scheduling indication to the UE during data transmission.

The sending, by the base station, the downlink control information DCI carrying the resource scheduling indication to the UE includes: sending, by the base station, the downlink control information DCI carrying the resource scheduling indication to the UE, where the resource scheduling indication is carried in redundancy information of the DCI, and the redundancy information includes: the RB allocation indication information, the modulation and coding scheme MCS information, the hybrid automatic repeat request HARQ information, or the HARQ redundancy version information.

The manner 2 is applicable to a situation where the UE only supports small data or common data, and complexity of bind detection is not increased, but a current mode of the UE, namely a small data processing mode or a common data processing mode, needs to be pre-configured.

For manner 3:

One possible embodiment is that the PDCCH is not modified, and a position of a sub-RB in an RB scheduled by the PDCCH is configured at a high layer.

The base station (eNB) pre-notifies, by using an existing DCI format, each UE of a mapping position of a sub-RB corresponding to each UE, and may notify each UE of a sub-RB criterion through a radio resource control protocol (RRC, Radio Resource Control) or by writing the information into initial firmware.

For example, one RB is divided into 4 sub-RBs, UE 1 to UE 4 use the first to the fourth sub-RBs sequentially, and UE 5 to UE 8 use the first to the fourth sub-RBs sequentially, and the rest may be deduced by analogy.

A position of a sub-RB corresponding to each UE in each RB may be changed in time frequency according to a certain pattern (pattern), for example, positions of sub-RBs corresponding to different RBs in different subframes are changed according to a criterion of the pattern.

In another possible embodiment, the DCI format does not need to be changed; an eNB pre-notifies a UE of a sub-RB mapping criterion through an RRC or by writing the information into initial firmware, and calculates a position of a sub-RB in an RB by using a time frequency position of the PDCCH. The UE obtains downlink subframe synchronization after downlink synchronization and is capable of obtaining a system frame number (SFN, system frame number) after correctly receiving information on a PBCH so as to obtain downlink frame synchronization.

It is assumed that one RB is divided into 4 sub-RBs, the position of the sub-RB is obtained according to a subframe number t_id(1-10)mod 4 of the PDCCH, and meanwhile sub-RB mapping may be performed with reference to pre-configuration information in the fourth embodiment.

That is to say, the resource scheduling indication is carried in a predefined position of which the UE is pre-notified. The predefined position is configured through the RRC or by using an initial value of the firmware. The predefined position carries a mapping position or a mapping criterion of a sub-RB corresponding to each UE.

In still another possible embodiment, when a radio network temporary identifier (RNTI, Radio network temporary identifier) carried by the PDCCH indicates a group of users, each sub-RB corresponding to the UE is indicated through a high-layer RRC or a serial number in the firmware to achieve the objective of allocating a resource to a group of users. One RNTI is used when one group of UEs are notified. The base station sends the PDCCH to the UEs in this group by using a group RNTI and notifies one group of UEs of sub-RB allocation by using the resource allocation indication.

The format of the PDCCH may be any one in table 1 to table 4. For example, one RB is divided into 6 sub-RBs, the number of the users in one group is 3, user 1 occupies No. 1 sub-RB, user 2 occupies No. 2 and No. 3 sub-RBs, and user 3 occupies No. 4, No. 5 and No. 6 sub-RBs.

In the PDCCH, the sub-RB indication resource uses a bitmap (bitmap). The number of the UEs in the user group is 3, and therefore each sub-RB occupies 2 bits. The first 2 bits correspond to a first sub-RB, the next 2 bits correspond to a second sub-RB, and 6 sub-RBs totally occupy 12 bits by analog, and the indication content is shown in table 5.

TABLE 5

| | Bitmap used by a resource | | | | |
|---|---|---|---|---|---|
| | 00 | 01 | 01 | 10 | 10 | 10 |
| Occupying user | User 1 | User 2 | User 2 | User 3 | User 3 | User 3 |

That is to say, the sending, by the base station, the resource scheduling indication to the user equipment UE includes: sending, by the base station, the resource scheduling indication to the UE, where the resource scheduling indication is carried in a predefined position of which the UE is pre-notified. The predefined position is configured through an RRC or by using an initial value of firmware; and the predefined position carries a mapping position or a mapping criterion of a sub-RB corresponding to each UE.

As can be seen from above, a resource block RB is pre-divided into a plurality of sub-RBs by applying the method provided in this embodiment of the present invention; and during data transmission, a UE is scheduled by using a resource scheduling indication to perform data receiving or sending in a position of a corresponding sub-RB, thereby improving resource utilization efficiency during transmission of a small data service and improving transmission efficiency of small data.

Figure 2:
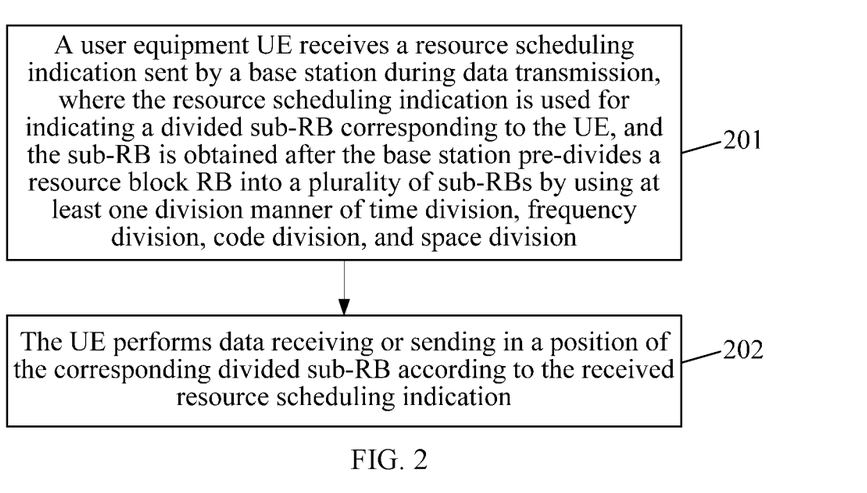
FIG. 2 is a flow chart of another resource scheduling method according to an embodiment of the present invention.

An embodiment of the present invention further provides a resource scheduling method. Referring to FIG. 2, the method is applied in a terminal and specifically includes:

Step 201: A user equipment UE receives a resource scheduling indication sent by a base station during data transmission, where the resource scheduling indication is used to indicate a divided sub-RB corresponding to the UE, and the sub-RB is obtained after the base station pre-divides a resource block RB into a plurality of sub-RBs by using at least one division manner of time division, frequency division, code division, and space division.

Step 202: The UE performs data receiving or sending in a position of the corresponding divided sub-RB according to the received resource scheduling indication.

It should be noted that one possible situation is that the receiving, by the UE, the resource scheduling indication sent by the base station includes: receiving, by the UE, the resource scheduling indication sent by the base station according to a used resource allocation manner, where the resource scheduling indication is carried in a bit position newly added in a resource block assignment instruction.

The receiving, by the UE, the resource scheduling indication sent by the base station according to a used resource allocation manner, where the resource scheduling indication is carried in a bit position newly added in a resource block assignment instruction includes:

receiving, by the UE, a resource scheduling indication sent by the base station through downlink transmission in a resource allocation manner of a direct bitmap and carried in a bit position corresponding to the number of bits in the resource block assignment instruction, where the number of bits is obtained by the base station according to $N_{RB'}^{DL/UL} - N_{RB}^{DL/UL}$; or receiving, by the UE, a resource scheduling indication sent by the base station through downlink transmission in a resource allocation manner of a type 0 bitmap and carried in a bit position corresponding to the number of bits in the resource block assignment instruction, where the number of bits is obtained by the base station according to $\lceil N_{RB'}^{DL}/P \rceil - \lceil N_{RB}^{DL/UL}/P \rceil$, and P=2, 3, or 4; or receiving, by the UE, a resource scheduling indication sent by the base station through downlink transmission in a resource allocation manner of a type 1 bitmap and carried in a bit position corresponding to the number of bits in the resource block assignment instruction, where the number of bits is obtained by the base station according to $\lceil N_{RB'}^{DL}/P \rceil - \lceil N_{RB}^{DL/UL}/P \rceil$, and P=2, 3, or 4; or receiving, by the UE, a resource scheduling indication sent by the base station through uplink or downlink transmission in a resource allocation manner of type 2 contiguous allocation and carried in a bit position corresponding to the number of bits in the resource block assignment instruction, where the number of bits is obtained by the base station according to $\lceil \log_2(N_{RB'}^{DL/UL} (N_{RB'}^{DL/UL}+1)) \rceil - \lceil \log_2(N_{RB}^{DL/UL} (N_{RB}^{DL/UL}+1)) \rceil$; or receiving, by the UE, a resource scheduling indication sent by the base station through downlink transmission in a resource allocation manner of distributed allocation and carried in a bit position corresponding to the number of bits in the resource block assignment instruction, where the number of bits is obtained by the base station according to $\lceil \log_2(N_{RB'}^{DL}(N_{RB'}^{DL}+1)) \rceil - \lceil \log_2(N_{RB}^{DL}(N_{RB}^{DL}+1)) \rceil$;

where $N_{RB}^{DL/UL}$ is the number of resource blocks RBs specified in a standard of a system, $N_{RB'}^{DL/UL}$ is the number of resource blocks RBs actually notified for allocation in the system; P is the number of RBs contained in an RB group; and DL represents a downlink direction, and UL represents an uplink direction.

It should be noted that another possible situation is that the receiving the resource scheduling indication sent by the base station includes: receiving, by the UE, the resource scheduling indication sent by the base station and carried in downlink control information DCI; or receiving, by the UE, the resource scheduling indication sent by the base station and carried in a predefined position of which the UE is pre-notified, where the predefined position is configured through an RRC or by using an initial value of firmware; and the predefined position carries a mapping position or a mapping criterion of a sub-RB corresponding to each UE.

A resource block RB is pre-divided into a plurality of sub-RBs by applying the method provided in this embodiment of the present invention; and during data transmission, a UE is scheduled by using a resource scheduling indication to perform data receiving or sending in a position of a corresponding sub-RB, thereby improving resource utilization efficiency during transmission of a small data service and improving transmission efficiency of small data.

Figure 3:
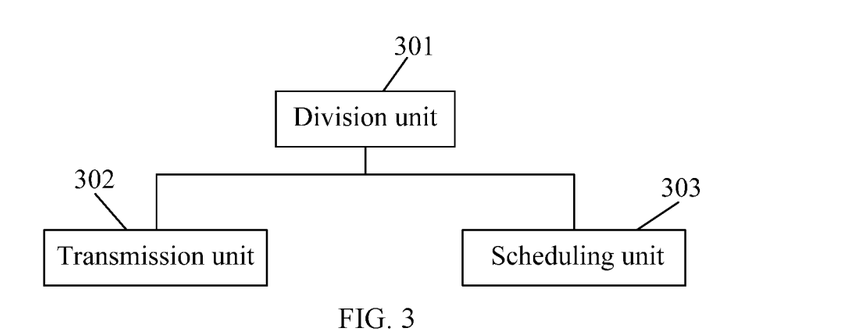
FIG. 3 is a logical schematic structural diagram of a resource scheduling apparatus according to an embodiment of the present invention.

An embodiment of the present invention further provides a resource scheduling apparatus. Referring to FIG. 3, the apparatus is applied in a base station and includes:

a division unit 301, configured to pre-divide a resource block RB into a plurality of sub-RBs by using at least one division manner of time division, frequency division, code division, and space division;

a transmission unit 302, configured to send a resource scheduling indication to a user equipment UE during data transmission, where the resource scheduling indication is used to indicate a sub-RB that is divided by the division unit and corresponds to the UE; and a scheduling unit 303, configured to schedule the UE by using the resource scheduling indication to perform data receiving or sending in a position of the corresponding sub-RB divided by the division unit.

The transmission unit is specifically configured to:

send the resource scheduling indication to the user equipment during data transmission according to a resource allocation manner used in the transmission, where the resource scheduling indication is carried in a bit position newly added in a resource block assignment instruction.

The transmission unit further includes:

a first obtaining module (not shown in the figure), configured to: if downlink transmission is performed and a resource allocation manner of a direct bitmap is used, obtain the number of bits by using $N_{RB'}^{DL/UL} - N_{RB}^{DL/UL}$, where the transmission unit is specifically configured to send a resource scheduling indication to the user equipment, the resource scheduling indication is carried in a bit position in the resource block assignment instruction, and the bit position corresponds to the number of bits that is obtained by the first obtaining module;

or a second obtaining module (not shown in the figure), configured to: if downlink transmission is performed and a resource allocation manner of a type 0 bitmap is used, obtain the number of bits by using $\lceil N_{RB'}^{DL/UL}/P \rceil - \lceil N_{RB}^{DL/UL}/P \rceil$, or 4; where the transmission unit is specifically configured to send a resource scheduling indication to the user equipment, the resource scheduling indication is carried in a bit position in the resource block assignment instruction, and the bit position corresponds to the number of bits that is obtained by the second obtaining module;

or a third obtaining module (not shown in the figure), configured to: if downlink transmission is performed and a resource allocation manner of a type 1 bitmap is used, obtain the number of bits by using $\lceil N_{RB'}^{DL/UL}/P \rceil - \lceil N_{RB}^{DL/UL}/P \rceil$, where P=2, 3, or 4; where the transmission unit is specifically configured to send a resource scheduling indication to the user equipment, the resource scheduling indication is carried in a bit position in the resource block assignment instruction, and the bit position corresponds to the number of bits that is obtained by the third obtaining module;

or a fourth obtaining module (not shown in the figure), configured to: if uplink or downlink transmission is performed and a resource allocation manner of type 2 contiguous allocation is used, obtain the number of bits by using $\lceil \log_2(N_{RB'}^{DL/UL}(N_{RB'}^{DL/UL}+1)) \rceil - \lceil \log_2(N_{RB}^{DL/UL}(N_{RB}^{DL/UL}+1)) \rceil$; where the transmission unit is specifically configured to send a resource scheduling indication to the user equipment, the resource scheduling indication is carried in a bit position in the resource block assignment instruction, and the bit position corresponds to the number of bits that is obtained by the fourth obtaining module;

or a fifth obtaining module (not shown in the figure), configured to: if downlink transmission is performed and a resource allocation manner of distributed allocation is used, obtain the number of bits by using $\lceil \log_2(N_{RB'}^{DL}(N_{RB'}^{DL}+1)) \rceil - \lceil \log_2(N_{RB}^{DL}(N_{RB}^{DL}+1)) \rceil$; where the transmission unit is specifically configured to send a resource scheduling indication to the user equipment, the resource scheduling indication is carried in a bit position in the resource block assignment instruction, and the bit position corresponds to the number of bits that is obtained by the fifth obtaining module;

where $N_{RB}^{DL/UL}$ is the number of resource blocks RBs specified in a standard of a system, $N_{RB'}^{DL/UL}$ is the number of resource blocks RBs actually notified for allocation in the system; P is the number of RBs contained in an RB group; and DL represents a downlink direction, and UL represents an uplink direction.

The transmission unit is specifically configured to send the resource scheduling indication to the UE during data transmission, where the resource scheduling indication is carried in downlink control information DCI.

The transmission unit is specifically configured to send the resource scheduling indication to the UE, where the resource scheduling indication is carried in redundancy information of the DCI, and the redundancy information includes: RB allocation indication information, modulation and coding scheme MCS information, hybrid automatic repeat request HARQ information, or HARQ redundancy version information.

The transmission unit is specifically configured to enable the base station to send the resource scheduling indication to the UE, where the resource scheduling indication is carried in a predefined position of which the UE is pre-notified, the predefined position is configured through an RRC or by using an initial value of firmware; and the predefined position carries a mapping position or a mapping criterion of a sub-RB corresponding to each UE.

A resource block RB is pre-divided into a plurality of sub-RBs by applying the apparatus provided in this embodiment of the present invention; and during data transmission, a UE is scheduled by using a resource scheduling indication to perform data receiving or sending in a position of a corresponding sub-RB, thereby improving resource utilization efficiency during transmission of a small data service and improving transmission efficiency of small data.

Figure 4:
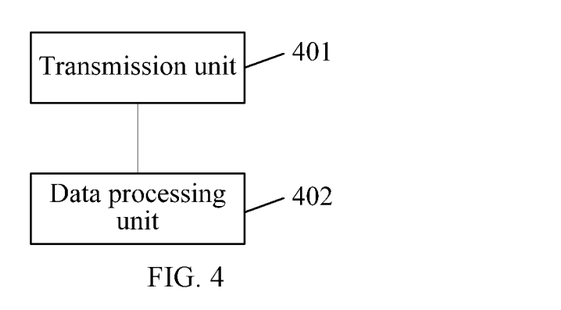
FIG. 4 is a logical schematic structural diagram of another resource scheduling apparatus according to an embodiment of the present invention.

An embodiment of the present invention further provides a resource scheduling apparatus, which is applied in a terminal. Referring to FIG. 4, the apparatus includes:

a transmission unit 401, configured to receive a resource scheduling indication sent by a base station, where the resource scheduling indication is used to indicate a divided sub-RB corresponding to a UE, and the sub-RB is obtained after the base station pre-divides a resource block RB into a plurality of sub-RBs by using at least one division manner of time division, frequency division, code division, and space division; and a data processing unit 402, configured to perform data receiving or sending in a position of the corresponding divided sub-RB according to the resource scheduling indication received by the transmission unit.

The transmission unit is specifically configured to receive the resource scheduling indication sent by the base station according to a resource allocation manner used in downlink transmission, where the resource scheduling indication is carried in a bit position newly added in a resource block assignment instruction.

The transmission unit is specifically configured to:

receive a resource scheduling indication sent by the base station through downlink transmission in a resource allocation manner of a direct bitmap and carried in a bit position corresponding to the number of bits in the resource block assignment instruction, where the number of bits is obtained by the base station according to $N_{RB'}^{DL} - N_{RB}^{DL}$; or receive a resource scheduling indication sent by the base station through downlink transmission in a resource allocation manner of a type 0 bitmap and carried in a bit position corresponding to the number of bits in the resource block assignment instruction, where the number of bits is obtained by the base station according to $\lceil N_{RB'}^{DL}/P \rceil - \lceil N_{RB}^{DL}/P \rceil$ and P=2, 3, or 4; or enable the UE to receive a resource scheduling indication sent by the base station through downlink transmission in a resource allocation manner of a type 1 bitmap and carried in a bit position corresponding to the number of bits in the resource block assignment instruction, where the number of bits is obtained by the base station according to $\lceil N_{RB'}^{DL}/P \rceil - \lceil N_{RB}^{DL}/P \rceil$, and P=2, 3, or 4; or enable the UE to receive a resource scheduling indication sent by the base station through uplink or downlink transmission in a resource allocation manner of type 2 contiguous allocation and carried in a bit position corresponding to the number of bits in the resource block assignment instruction, where the number of bits is obtained by the base station according to $\lceil \log_2(N_{RB'}^{DL/UL}(N_{RB}^{DL/UL}+1))\rceil - \lceil \log_2(N_{RB}^{DL/UL}(N_{RB}^{DL/UL}+1))\rceil$; or enable the UE to receive a resource scheduling indication sent by the base station through downlink transmission in a resource allocation manner of distributed allocation and carried in a bit position corresponding to the number of bits in the resource block assignment instruction, where the number of bits is obtained by the base station according to $\lceil \log_2(N_{RB'}^{DL}(N_{RB}^{DL}+1))\rceil - \lceil \log_2(N_{RB}^{DL}(N_{RB}^{DL}+1))\rceil$;

where $N_{RB'}^{DL/UL}$ is the number of resource blocks RBs specified in a standard of a system, $N_{RB'}^{DL/UL}$ is the number of resource blocks RBs actually notified for allocation in the system; P is the number of RBs contained in an RB group; and DL represents a downlink direction, and UL represents an uplink direction.

The transmission unit may be further specifically configured to:

receive the resource scheduling indication sent by the base station and carried in downlink control information DCI; or receive the resource scheduling indication sent by the base station and carried in a predefined position of which the UE is pre-notified;

where the predefined position is configured through an RRC or by using an initial value of firmware; and the predefined position carries a mapping position or a mapping criterion of a sub-RB corresponding to each UE.

A resource block RB is pre-divided into a plurality of sub-RBs by applying the apparatus provided in this embodiment of the present invention; and during data transmission, a UE is scheduled by using a resource scheduling indication to perform data receiving or sending in a position of a corresponding sub-RB, thereby improving resource utilization efficiency during transmission of a small data service and improving transmission efficiency of small data.

The apparatus embodiments are described briefly because they are basically similar to the method embodiments, and for relevant parts, reference may be made to some description in the method embodiments.

It should be noted that the relational terms such as "first" and "second" are only used to distinguish an entity or operation from another entity or operation, without necessarily requiring or implying any practical relationship or sequence between the entities or operations. In addition, the term "include", "contain", or any other variants are intended to cover the non-exclusive inclusion. Therefore, the process, method, article, or device including a series of elements not only include those elements, but also include other elements not clearly listed, or include the inherent elements of the process, method, article, or device. Without further limitation, the element defined by a phrase "include a . . . " does not exclude other same elements in the process, method, article, or device including the element.

Persons of ordinary skill in the art may understand that all or a part of steps in the method of the foregoing embodiments may be implemented by a computer program instructing relevant hardware. The program may be stored in a computer readable storage medium. The storage medium may include a ROM/RAM, a magnetic disk, and an optical disk.

The foregoing descriptions are only exemplary embodiments of the present invention, and are not intended for limiting the protection scope of the present invention. Any modifications, equivalent replacements, or improvements made without departing from the spirit and principle of the present invention should fall within the protection scope of the present invention.

What is claimed is:

1. A resource scheduling method, comprising:
   pre-dividing, by a base station, a resource block (RB) into a plurality of sub-RBs by using frequency division manner;
   obtaining, by the base station, a number of bits based on a difference between a number of resource blocks (RBs) specified by the standard in a system and a number of RBs actually notified to be allocated in the system when an uplink transmission is performed and a resource allocation manner of type 2 contiguous allocation is used;
   sending, by the base station, a resource scheduling indication to a user equipment (UE) during data transmission, wherein the resource scheduling indication is used to indicate a divided sub-RB corresponding to the UE, and the resource scheduling indication is carried in a bit position in a resource block assignment instruction, the bit position corresponding to the number of bits; and
   scheduling, by the base station, the UE to perform data receiving or sending in a position of the corresponding divided sub-RB.

2. The method according to claim 1, wherein the sending, by the base station, a resource scheduling indication to a UE during data transmission comprises:
   sending, by the base station, downlink control information (DCI) carrying the resource scheduling indication to the UE during data transmission.

3. The method according to claim 2, wherein the resource scheduling indication is carried in redundancy information of the DCI.

4. The method according to claim 3, wherein the redundancy information comprises: RB block allocation indication information, modulation and coding scheme (MCS) information, hybrid automatic repeat request (HARQ) information, or HARQ redundancy version information.

5. A method of resource scheduling, comprising:
   receiving, by a user equipment (UE), a resource scheduling indication sent by a base station during data transmission, wherein the resource scheduling indication is used to indicate a divided sub-resource blocks (RB) corresponding to the UE, and the resource scheduling indication is carried in a bit position in a resource block assignment instruction, the bit position corresponding to the number of bits, wherein the sub-RB is obtained after the base station pre-divides RB into a plurality of sub-RBs by using at frequency division, wherein the number of bits is obtained by the base station based on a difference between a number of resource blocks (RBs) specified by the standard in a system and a number of RBs actually notified to be allocated in the system when an uplink transmission is performed and a resource allocation manner of type 2 contiguous allocation is used; and
   performing, by the UE, data receiving or sending in a position of the corresponding divided sub-RB according to the received resource scheduling indication.

6. The method according to claim 5, wherein the receiving the resource scheduling indication sent by the base station comprises:
   receiving, by the UE, the resource scheduling indication sent by the base station and carried in downlink control information (DCI).

7. The method according to claim 6, wherein the resource scheduling indication is carried in redundancy information of the DCI.

8. The method according to claim 7, wherein the redundancy information comprises: RB block allocation indication information, modulation and coding scheme (MCS) information, hybrid automatic repeat request (HARQ) information, or HARQ redundancy version information.

9. A resource scheduling apparatus, comprising:
a memory; and
a processor coupled to the memory and configured to:
pre-divide a resource block (RB) into a plurality of sub-RBs by using frequency division;
obtain a number of bits based on a difference between a number of resource blocks (RBs) specified by the standard in a system and a number of RBs actually notified to be allocated in the system when an uplink transmission is performed and a resource allocation manner of type 2 contiguous allocation is used;
send a resource scheduling indication to a user equipment (UE) during data transmission, wherein the resource scheduling indication is used to indicate a sub-RB that is divided by the processor and corresponds to the UE, and the resource scheduling indication is carried in a bit position in a resource block assignment instruction, the bit position corresponding to the number of bits; and
schedule the UE by using the resource scheduling indication to perform data receiving or sending in a position of the corresponding sub-RB.

10. The apparatus according to claim 9, wherein the processor is further configured to:
send the resource scheduling indication to the UE during data transmission, wherein the resource scheduling indication is carried in downlink control information (DCI).

11. The apparatus according to claim 10, wherein the resource scheduling indication is carried in redundancy information of the DCI.

12. The apparatus according to claim 11, wherein the redundancy information comprises: RB allocation indication information, modulation and coding scheme (MCS) information, hybrid automatic repeat request (HARQ) information, or HARQ redundancy version information.

13. A resource scheduling apparatus, comprising:
a memory; and
a processor coupled to the memory and configured to:
receive a resource scheduling indication sent by a base station, wherein the resource scheduling indication is used to indicate a divided sub-resource blocks (RB) corresponding to a user equipment (UE), and the resource scheduling indication is carried in a bit position in a resource block assignment instruction, the bit position corresponding to the number of bits, wherein the sub-RB is obtained after the base station pre-divides RB into a plurality of sub-RBs by using at frequency division, wherein the number of bits is obtained by the base station based on a difference between a number of resource blocks (RBs) specified by the standard in a system and a number of RBs actually notified to be allocated in the system when an uplink transmission is performed and a resource allocation manner of type 2 contiguous allocation is used; and
perform data receiving or sending in a position of the corresponding divided sub-RB according to the resource scheduling indication received by the transmitter.

14. The apparatus according to claim 13, wherein the processor is further configured to:
receive the resource scheduling indication sent by the base station and carried in downlink control information (DCI).

15. The apparatus according to claim 14, wherein the resource scheduling indication is carried in redundancy information of the DCI.

16. The apparatus according to claim 15, wherein the redundancy information comprises: RB block allocation indication information, modulation and coding scheme (MCS) information, hybrid automatic repeat request (HARQ) information, or HARQ redundancy version information.

17. A non-transitory computer readable medium storing a program for use by a base station for transmitting uplink control information (UCI), wherein the program comprises instructions for:
pre-dividing a resource block (RB) into a plurality of sub-RBs by using frequency division;
obtaining, by the base station, a number of bits based on a difference between a number of resource blocks (RBs) specified by the standard in a system and a number of RBs actually notified to be allocated in the system when an uplink transmission is performed and a resource allocation manner of type 2 contiguous allocation is used;
sending a resource scheduling indication to a user equipment (UE) during data transmission, wherein the resource scheduling indication is used to indicate a divided sub-RB corresponding to the UE, and the resource scheduling indication is carried in a bit position in a resource block assignment instruction, the bit position corresponding to the number of bits; and
scheduling the UE to perform data receiving or sending in a position of the corresponding divided sub-RB.

18. The non-transitory computer readable medium according to claim 17, wherein the sending a resource scheduling indication to a UE during data transmission comprises:
sending downlink control information (DCI) carrying the resource scheduling indication to the UE during data transmission.

19. A non-transitory computer readable medium storing a program for use by a user equipment (UE) for transmitting uplink control information (UCI), wherein the program comprises instructions for:
receive a resource scheduling indication sent by a base station, wherein the resource scheduling indication is used to indicate a divided sub-resource blocks (RB) corresponding to a user equipment (UE), and the resource scheduling indication is carried in a bit position in a resource block assignment instruction, the bit position corresponding to the number of bits, wherein the sub-RB is obtained after the base station pre-divides RB into a plurality of sub-RBs by using at, frequency division, wherein the number of bits is obtained by the base station based on a difference between a number of resource blocks (RBs) specified by the standard in a system and a number of RBs actually notified to be allocated in the system when an uplink transmission is performed and a resource allocation manner of type 2 contiguous allocation is used; and
performing data receiving or sending in a position of the corresponding divided sub-RB according to the received resource scheduling indication.

20. The non-transitory computer readable medium according to claim 19, wherein the receiving the resource scheduling indication sent by the base station comprises:
   receiving the resource scheduling indication sent by the base station and carried in downlink control information (DCI).

21. The resource scheduling method according to claim 1, wherein the number of bits are obtained according to the following:
$\lceil \log_2(N_{RB'}^{DL/UL} \ (N_{RB'}^{DL/UL}+1)) \rceil - \lceil \log_2(N_{RB}^{DL/UL} \ (N_{RB}^{DL/UL}+1)) \rceil$, wherein $N_{RB}^{DL/UL}$ is s the number of resource blocks RBs specified by the standard in a system, $N_{RB'}^{DL/UL}$ is the number of resource blocks RBs actually notified to be allocated in the system, DL represents a downlink direction, and UL represents an uplink direction.

22. The method of resource scheduling according to claim 5, wherein the number of bits are obtained according to the following:
$\lceil \log_2(N_{RB'}^{DL/UL} \ (N_{RB'}^{DL/UL}+1)) \rceil - \lceil \log_2(N_{RB}^{DL/UL} \ (N_{RB}^{DL/UL}+1)) \rceil$, wherein $N_{RB}^{DL/UL}$ is s the number of resource blocks RBs specified by the standard in a system, $N_{RB'}^{DL/UL}$ is the number of resource blocks RBs actually notified to be allocated in the system, DL represents a downlink direction, and UL represents an uplink direction.

23. The resource scheduling apparatus according to claim 9, wherein the number of bits are obtained according to the following:
$\lceil \log_2(N_{RB'}^{DL/UL} \ (N_{RB'}^{DL/UL}+1)) \rceil - \lceil \log_2(N_{RB}^{DL/UL} \ (N_{RB}^{DL/UL}+1)) \rceil$, wherein $N_{RB}^{DL/UL}$ is the number of resource blocks RBs specified by the standard in a system, $N_{RB'}^{DL/UL}$ is the number of resource blocks RBs actually notified to be allocated in the system, DL represents a downlink direction, and UL represents an uplink direction.

24. The resource scheduling apparatus according to claim 13, wherein the number of bits are obtained according to the following:
$\lceil \log_2(N_{RB'}^{DL/UL} \ (N_{RB'}^{DL/UL}+1)) \rceil - \lceil \log_2(N_{RB}^{DL/UL} \ (N_{RB}^{DL/UL}+1)) \rceil$, wherein $N_{RB}^{DL/UL}$ is the number of resource blocks RBs specified by the standard in a system, $N_{RB'}^{DL/UL}$ is the number of resource blocks RBs actually notified to be allocated in the system, DL represents a downlink direction, and UL represents an uplink direction.

25. The non-transitory computer readable medium according to claim 17, wherein the number of bits are obtained according to the following:
$\lceil \log_2(N_{RB'}^{DL/UL} \ (N_{RB'}^{DL/UL}+1)) \rceil - \lceil \log_2(N_{RB}^{DL/UL} \ (N_{RB}^{DL/UL}+1)) \rceil$, wherein $N_{RB}^{DL/UL}$ is the number of resource blocks RBs specified by the standard in a system, $N_{RB'}^{DL/UL}$ is the number of resource blocks RBs actually notified to be allocated in the system, DL represents a downlink direction, and UL represents an uplink direction.

26. The non-transitory computer readable medium according to claim 19, wherein the number of bits are obtained according to the following:
$\lceil \log_2(N_{RB'}^{DL/UL} \ (N_{RB'}^{DL/UL}+1)) \rceil - \lceil \log_2(N_{RB}^{DL/UL} \ (N_{RB}^{DL/UL}+1)) \rceil$, wherein $N_{RB}^{DL/UL}$ is the number of resource blocks RBs specified by the standard in a system, $N_{RB'}^{DL/UL}$ is the number of resource blocks RBs actually notified to be allocated in the system, DL represents a downlink direction, and UL represents an uplink direction.

* * * * *

UNITED STATES PATENT AND TRADEMARK OFFICE
CERTIFICATE OF CORRECTION

PATENT NO. : 10,736,123 B2
APPLICATION NO. : 16/178999
DATED : August 4, 2020
INVENTOR(S) : Li Wang, Zhenxing Hu and Jie Ma It is certified that error appears in the above-identified patent and that said Letters Patent is hereby corrected as shown below:

In the Claims

Column 21, Line 11, Claim 21 delete "s" between "is" and "the number of".

Column 21, Line 21, Claim 22 delete "s" between "is" and "the number of".

Signed and Sealed this
Twentieth Day of April, 2021

Drew Hirshfeld
*Performing the Functions and Duties of the
Under Secretary of Commerce for Intellectual Property and
Director of the United States Patent and Trademark Office*